United States Patent [19]
Fujihara et al.

[11] Patent Number: 5,364,229
[45] Date of Patent: Nov. 15, 1994

[54] HYDROELECTRIC MACHINES AND THEIR INSTALLATION

[75] Inventors: Tetuo Fujihara, Katsuta; Takashi Ito; Fuminori Iwaki, both of Hitachi; Hitoshi Ichikawa, Iwaki, all of Japan

[73] Assignee: Hitachi, Ltd., Tokyo, Japan

[21] Appl. No.: 34,392

[22] Filed: Mar. 18, 1993

[30] Foreign Application Priority Data

Mar. 19, 1992 [JP] Japan ................................. 4-063145
Sep. 1, 1992 [JP] Japan ................................. 4-233320

[51] Int. Cl.⁵ .............................................. F01D 17/12
[52] U.S. Cl. ..................................... 415/163; 415/160; 415/214.1
[58] Field of Search ................ 415/150, 151, 155, 166, 415/163, 164, 213.1, 214.1

[56] References Cited

U.S. PATENT DOCUMENTS

| | | | |
|---|---|---|---|
| 1,516,095 | 11/1924 | Haeberlein | 415/163 |
| 2,770,943 | 11/1956 | Beale | 415/163 |
| 3,276,742 | 10/1966 | Yokoi . | |
| 3,494,704 | 2/1970 | Culaud et al. . | |
| 3,512,899 | 5/1970 | Lindquist | 415/160 |
| 3,904,311 | 9/1975 | Moriguti et al. | 415/163 |
| 4,468,570 | 8/1984 | Takahashi . | |

FOREIGN PATENT DOCUMENTS

| | | | |
|---|---|---|---|
| 1544592 | 11/1967 | France . | |
| 2282543 | 7/1975 | France . | |
| 0216960 | 2/1957 | Italy | 415/163 |
| 0556051 | 2/1957 | Italy | 415/164 |
| 51-46631 | 4/1976 | Japan . | |
| 0088271 | 6/1982 | Japan | 415/214.1 |

Primary Examiner—Edward K. Look
Assistant Examiner—Mark Sgantzos
Attorney, Agent, or Firm—Antonelli, Terry, Stout & Kraus

[57] ABSTRACT

A hydroelectric installation includes a hydraulic machine connected vertically below an electric machine by a shaft, in a concrete installation pit. A guide vane assembly of the hydraulic machine is operated by a motor-driven operating unit which projects below the hydraulic machine in a lower working space of the pit. The shaft has a thrust bearing which bears down against the upper cover of the hydraulic machine and thereby substantially cancels upward hydraulic force exerted on that upper cover. In the installation procedure, the outer casing, speed ring and upper cover of the hydraulic machine are installed first, so that the hydraulic machine can be assembled downwardly in the lower working space concurrently with upward assembly of the electric machine in an upper working space of the pit. This shortens installation time.

21 Claims, 11 Drawing Sheets

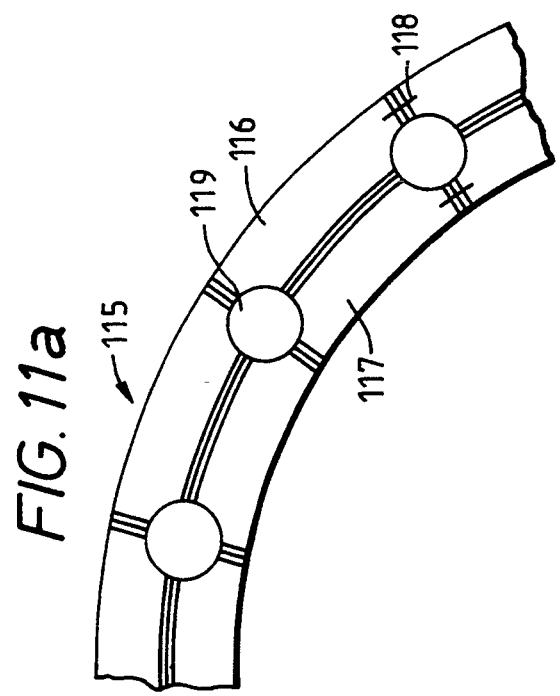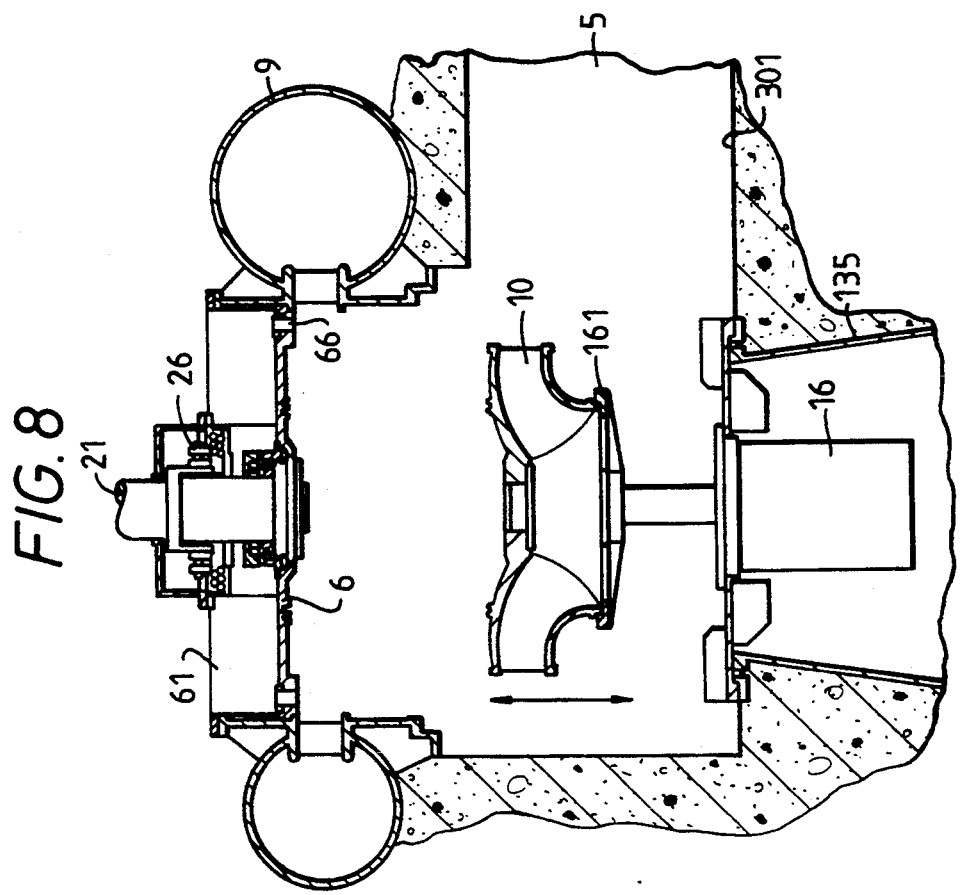

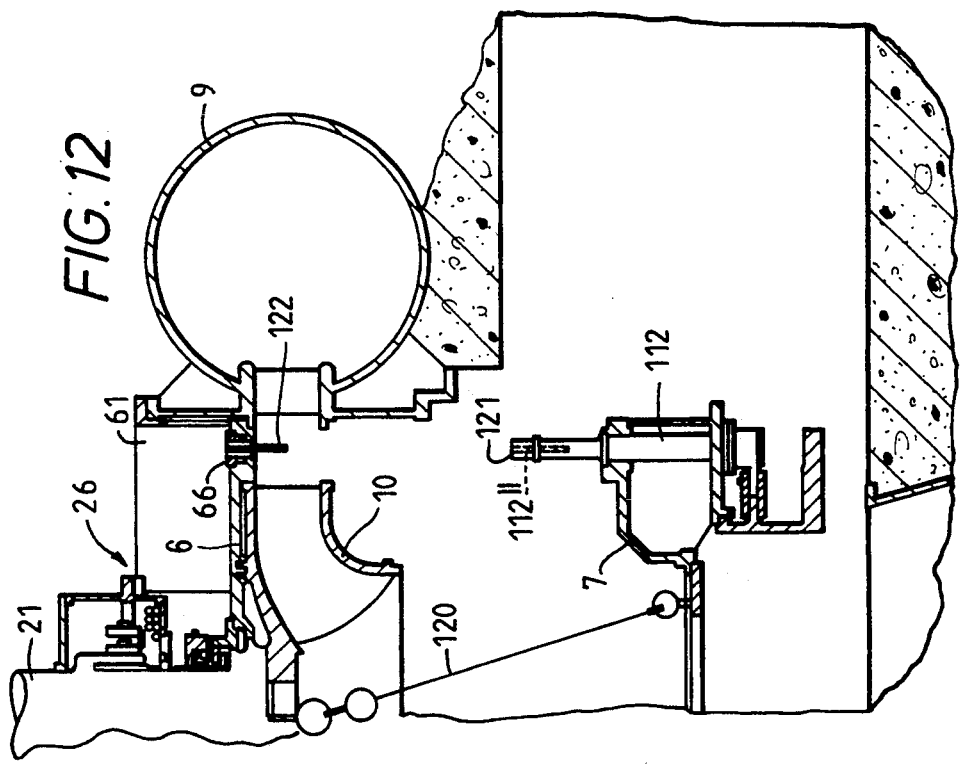
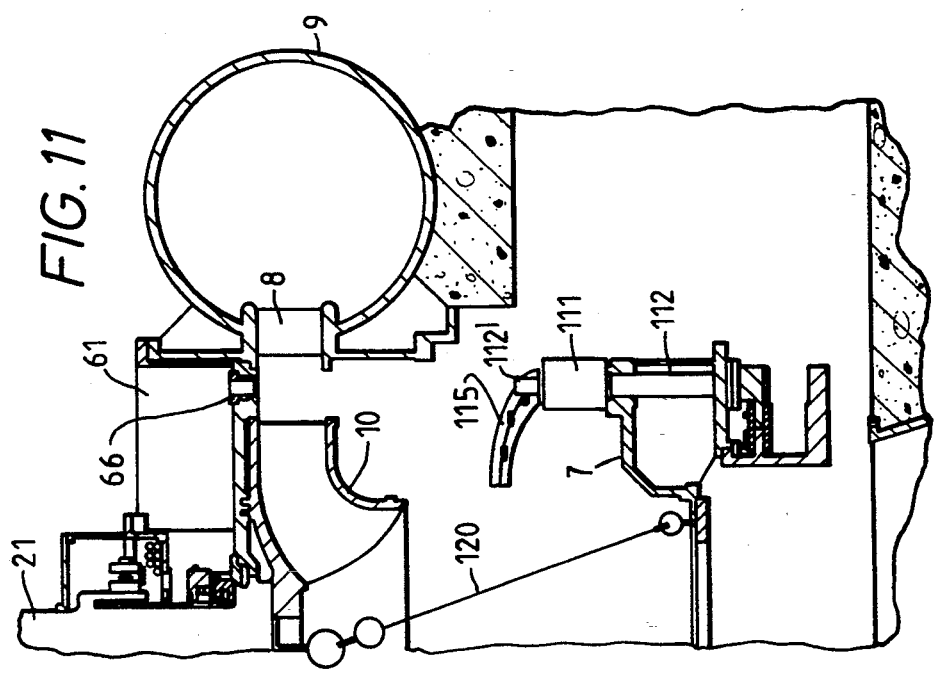

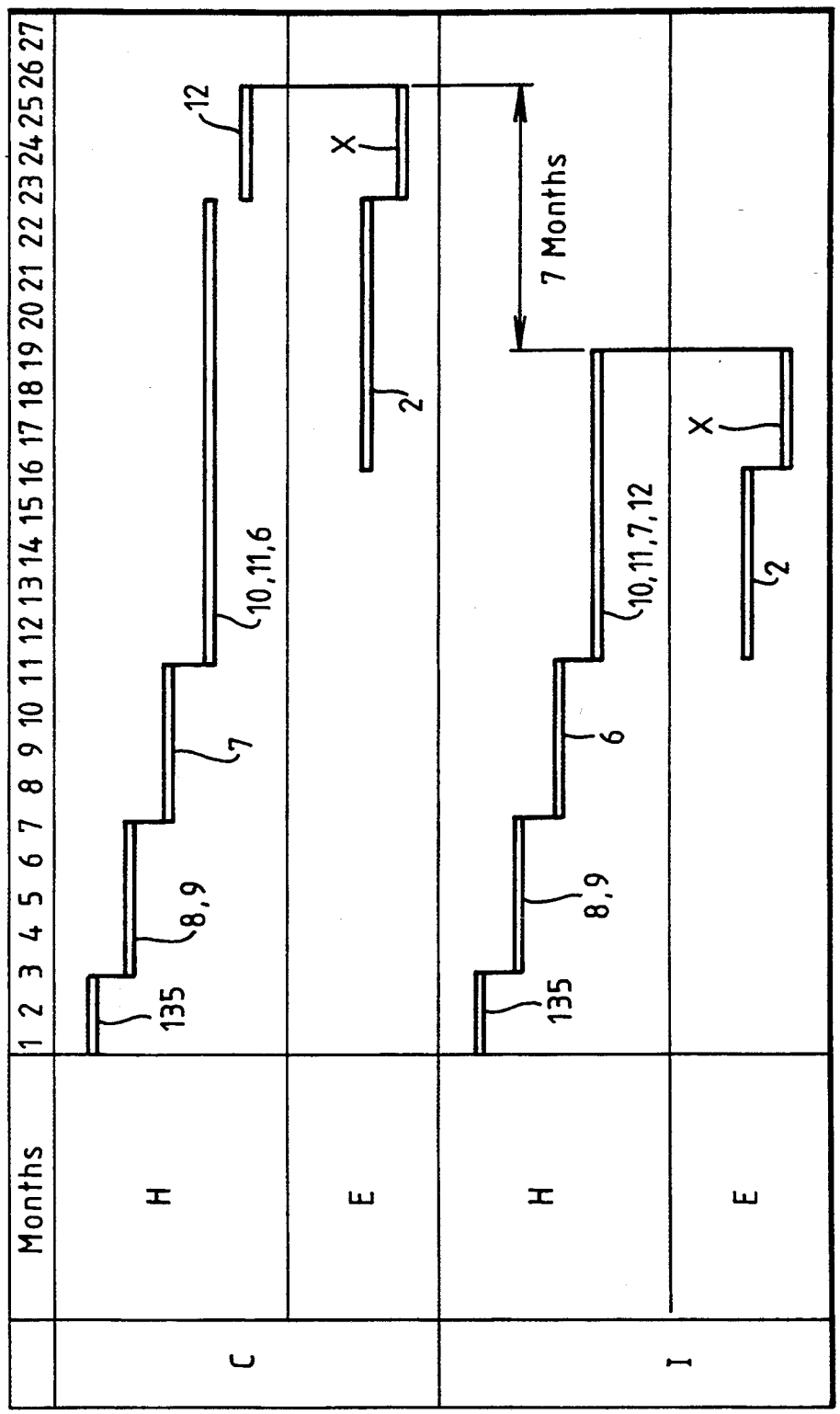

HYDROELECTRIC MACHINES AND THEIR INSTALLATION

FIELD OF THE INVENTION

This invention relates to hydroelectric machines and their installation. In particular, it is concerned with achieving a hydroelectric installation that can be assembled in a relatively short time, and is vertically compact.

BACKGROUND OF THE INVENTION

A conventional hydroelectric installation, whether operated as a pump or as a generator, has an electric machine connected vertically above a single-stage hydraulic machine through a shaft connecting the electric rotor to the hydraulic runner. In the conventional installation procedure, a pit is dug and a draft conduit, to take output water, is formed through the bottom to the pit. The up-turned pipe of the draft conduit, surrounded by concrete, is used as a basis on which the hydraulic machine is assembled by arranging the spiral casing, speed ring and lower cover thereof on top. The runner is placed in the lower cover and the upper cover fitted. An operating drive and drive linkage for the guide vanes of the water chamber are positioned above the upper cover, connected to the guide vanes. This hydraulic assembly is concreted in place. The electric machine is then installed above the hydraulic machine, the main rotor shaft of the electric machine being passed from above through the upper cover and connected to the runner of the hydraulic machine.

In the prior art, JP-A-56/83572 describes a hydroelectric generator of the type mentioned.

The installation of such a hydraulic machine is a very long and arduous task. The present inventors have reconsidered the installation procedure and developed a new installation concept which can produce a number of useful advantages.

SUMMARY OF THE INVENTION

The general object of this invention is to provide new hydroelectric installations and procedures by which they are installed.

One preferred object is to make a hydroelectric installation more vertically compact.

Another preferred object is to reduce total installation time.

A further preferred object is to reduce the strength requirements for the upper cover of the hydraulic machine.

A further preferred object is to make the hydraulic machine easier to service and maintain.

Generally, we propose that the hydroelectric installation be formed by establishing a vertically-intermediate fixing location of outer and/or upper parts of the hydraulic machine, particularly the upper cover, but usually also the spiral casing, speed ring and upper cover, and then assembling the hydraulic machine from below in a working space established in the pit below this vertically intermediate fixing location.

In this way, it becomes possible to support components of the electric machine upwardly in relation to the intermediate fixing location at the same time as assembling the lower components of the hydraulic machine. This can reduce overall installation time.

It also becomes practicable to position an operating unit for guide vanes of the hydraulic machine below the guide vane assembly, in the lower working space, instead of above as is conventional. Space above the upper cover, conventionally occupied by this operating unit, is then redundant and the length of the shaft can be reduced accordingly. This improves vertical compactness.

Furthermore, it is particularly preferred that the shaft have a thrust bearing which bears down onto the upper cover of the hydraulic machine. This also contributes to compactness, as aforesaid. Very importantly, however, it serves to counter upward hydraulic force exerted on the upper cover in operation, so that elaborate precautions to massively reinforce the upper cover are no longer necessary.

The lower assembly space for the hydraulic machine is conveniently maintained after installation, and this enables subsequent disassembly and/or maintenance of the hydraulic machine without the need to dismantle the electric machine first.

We find that with this new concept, vertical compactness can be achieved so that preferably the radius of the hydraulic machine's spiral case is greater than the vertical height from the spiral case's median level to the floor on which the stator of the electric machine is mounted.

Embodiments of the invention are now described in detail, with reference to the accompanying drawings.

BRIEF DESCRIPTION OF THE DRAWINGS

FIG. 8 shows installation of a turbine runner;

FIG. 11 shows schematically one way of guiding vane stems when installing the bottom cover;

FIG. 11(a) shows a detail of the guide;

FIG. 12 shows schematically a second way of guiding vane stems when installing the bottom cover;

FIG. 15 is a chart illustrating time saved using the present installation procedure.

DETAILED DESCRIPTION OF THE PREFERRED EMBODIMENTS

Figure 1:
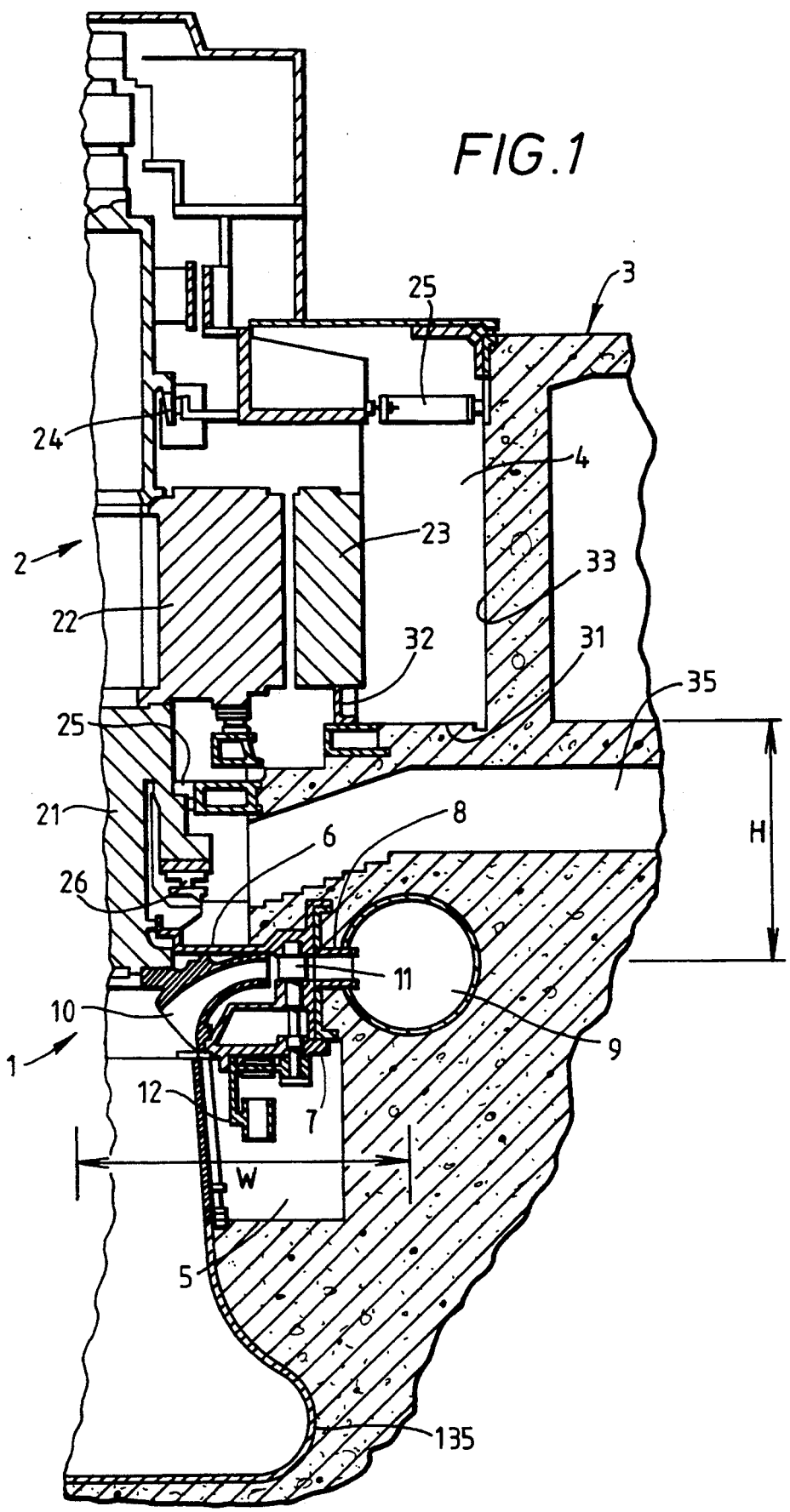
FIG. 1 is a radial vertical section through a first embodiment of hydroelectric installation.
Figure 2:
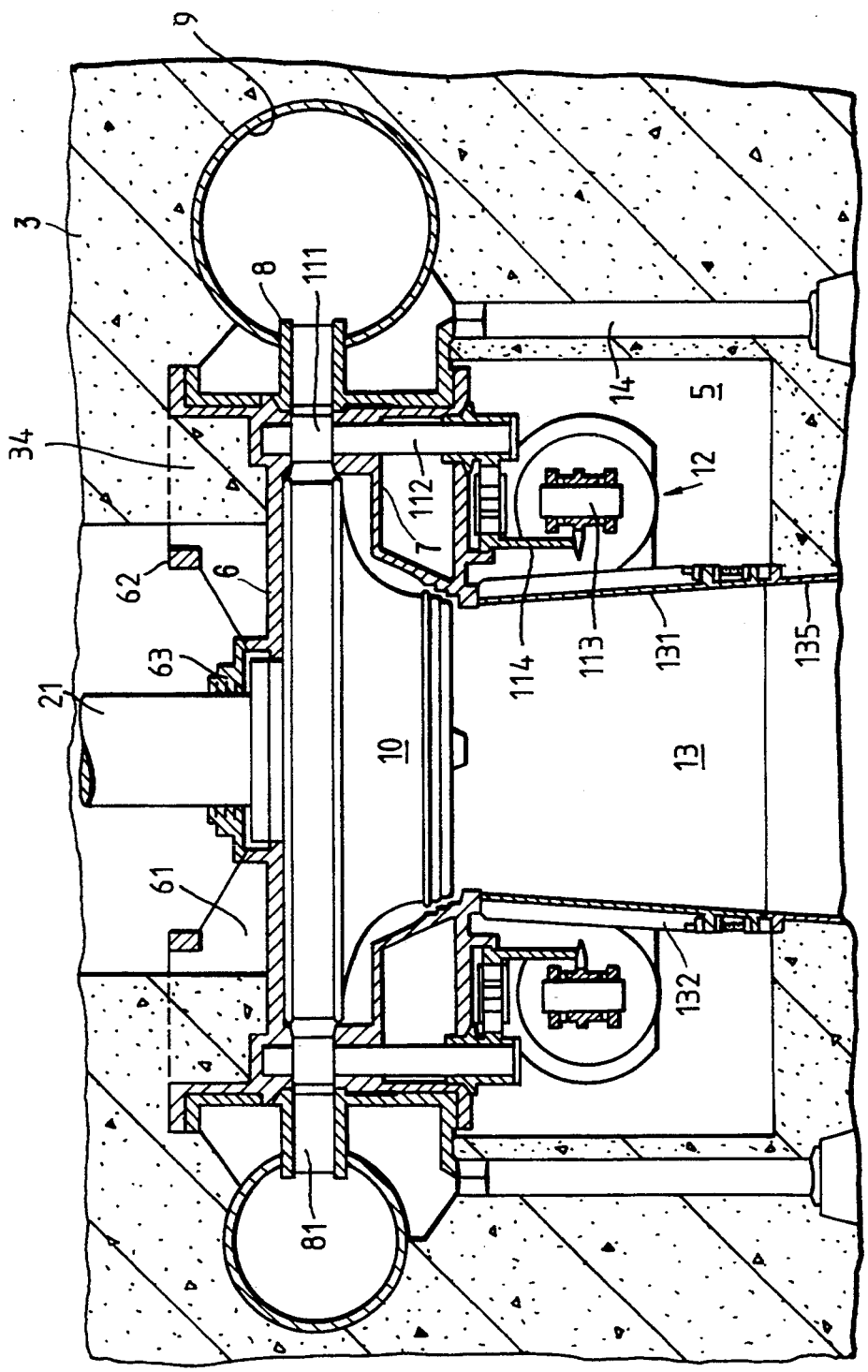
FIG. 2 is a radial vertical section showing enlarged a hydraulic machine of the installation of FIG. 1.

With reference to FIGS. 1 and 2, a hydroelectric installation has a single-stage hydraulic machine 1 installed vertically below an electric machine 2 in an installation surround 3. They are connected by a shaft 21 so that the bladed runner 10 of the hydraulic machine 1 rotates with the rotor 22 of the electric machine 2. The installation surround 3 is formed in a vertical-dug pit, and defines an annular upper space 4 in which the stator 23 of the electric machine 2 is mounted on a support base 32 resting on an intermediate floor 31 of the pit. In most cases the installation is a generator, in which the hydraulic machine is driven by a head of water to generate electricity from the electric machine 2. However these concepts apply also to installations used for pumping, in which the electric machine acts as a motor to drive the hydraulic machine runner.

The shaft 21 has three bearings. An upper radial bearing 24 is supported by brackets 25 extending from the inward wall 33 of the upper space 4, a short distance above the rotor 22. A lower radial bearing 25., below the rotor 22, bears against an adjacent inner shoulder of the intermediate floor 31. Finally, a vertical thrust bearing 26 near the bottom of the shaft 21 acts downwardly against a reinforced upper cover 6 of the hydraulic machine 1. The circular upper cover 6, which extends right across the circular opening between the upper space 4 of the electric machine and the lower space 5 of the hydraulic machine, is seen more clearly in FIG. 2 and has, on its essentially circular plate, a plurality of reinforcing ribs 61 which carry bearing points 62 for the thrust bearing 26. The shaft 21 runs rotatably through its centre aperture, engaged by a shaft sealing device 63 of known type. The periphery of the upper cover 6 is overlapped by concrete 34 of the installation surround, which helps to reinforce it from above against water pressure.

The general layout of the hydraulic machine 1 is best seen in FIG. 2. Its basic elements are conventional. An outer spiral casing (or volute) 9 is defined horizontally within a steel lining embedded in concrete of the installation surround 3. This spiral casing 9 receives water under pressure and guides it into a circular path. The spiral casing 9 is open around its inner periphery, where it is welded to a speed ring 8 having upper and lower circular opposed plates connected by static vanes 81 which establish a smooth inward flow of the pressurised water. The speed ring plates are welded to the upper and lower covers 6,7 of the hydraulic machine 1 respectively, at their inner peripheries. A turbine space is defined between the upper and lower covers 6,7. The runner 10, bolted to the bottom of the shaft 21, is rotated in this space by the pressurised water flow which is then exhausted downwardly into a draft conduit 13 leading down to an exhaust pond. The draft conduit 13 has an upper part 131 which extends up through the lower space 5 for the hydraulic machine. To help it withstand the weight and pressure forces, it has outer reinforcing ribs 132. A lower part 135 of the draft conduit 13 is constituted by a steel liner surrounded and supported by the concrete of the pit installation surround 3.

The water flow into the turbine space is actively governed by movable guide vanes 111 of a guide vane assembly 11. Plural—usually ten to thirty—guide vanes 111 are distributed circumferentially around the turbine space, just inwardly of the speed ring 8, and each is journalled by a vertical shaft 112 engaging in the upper and lower covers 6,7 and drivable in rotation by an operation unit 12. The operation unit 12 projects below the bottom cover 7 into the lower space 5 of the installation. It comprises a drive source and means for connecting the drive source to the vanes 111 through the shaft 112. Typically the drive is by a servo motor 113 (usually two, disposed diametrically opposite one another) connected to rotate the shafts through a guide link mechanism 114.

FIG. 2 shows also, embedded in the concrete, elements of an adjustable support frame 14, used to align the speed ring and spiral case during construction as will be explained later.

The hydroelectric installation is accessible at various locations through passages in the concrete of the installation surround 3. FIG. 1 shows one such passage 35 leading to a location at the thrust bearing 26. Other passages leading to other locations are not visible in this section, but will be discussed below.

It is an important feature of this construction that the thrust bearing 26 of the electric machine shaft 21 bears down on the upper cover 6 of the hydraulic machine. In operation, water pressure exerts an enormous upward force—perhaps 10,000 t—against this cover. The cover diameter is typically three or four meters. Conventionally this force has been met by massive reinforcement of the cover 6, which reinforcement extends for some distance vertically. In this construction, however, the thrust bearing 26 of the shaft 21 bears down against the cover 6 rather than against the pit wall as in previous constructions. In addition to the (relatively small) downforce caused by the mass of the electric machine rotor, the shaft is subject to the very large hydraulic downforce exerted on the runner 10, corresponding generally in magnitude to the upward hydraulic force on the cover 6 from below. Consequently there is a substantial cancellation of the upward and downward forces acting on the cover, and the reinforcing ribs 61 thereof can be made relatively modest in size.

The overlapping of concrete 34 around the periphery of the cover also helps to reinforce it and prevent leakages.

The engagement of the thrust bearing 26 against the upper cover 6 is made possible by disposing the operating unit 12 of the guide vane assembly 11 on the lower side of the hydraulic machine, instead of on the upper side as is conventional. In turn, this feature can be achieved by a special installation procedure which is now described with reference to FIGS. 3 to 14.

Installing a hydroelectric generator usually first requires the formation through rock of an intake conduit leading down from a high water source to the installation site, a cave at the installation site, and a discharge (draft) conduit leading down from the site to an exhaust location for the spent water. This laborious procedure is conventional, and not described here.

The hydroelectric installation is created in the cave by a process of gradual assembly, including forming gradually the concrete installation pit surround 3 which provides location and support for the installation components.

Figure 3:
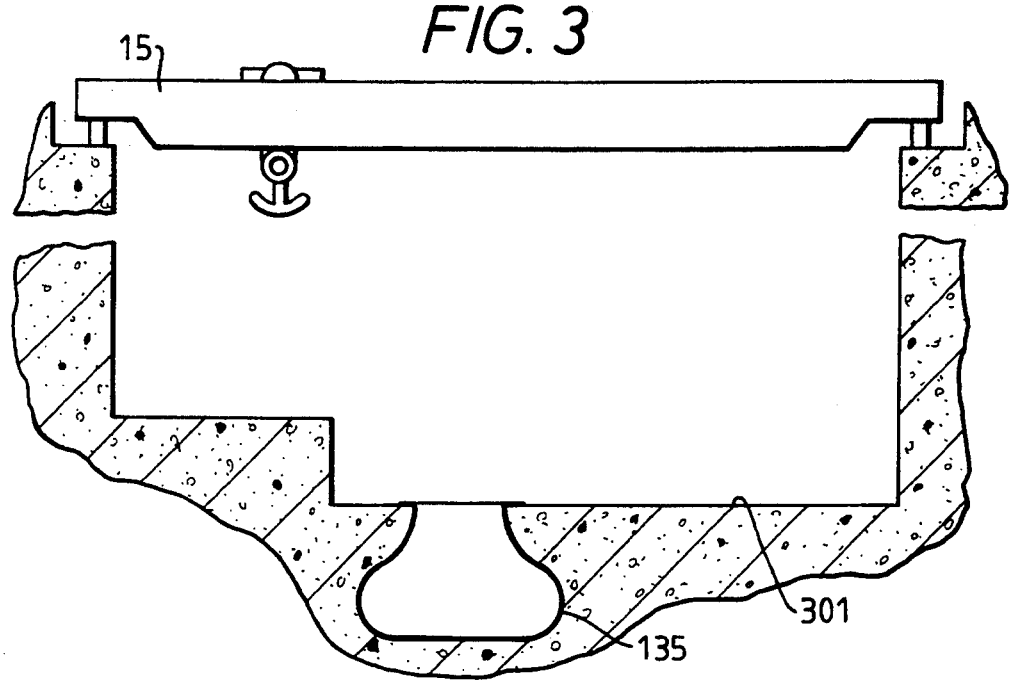
FIG. 3 is a vertical section showing initial forming of a pit and draft conduit.
Figure 4:
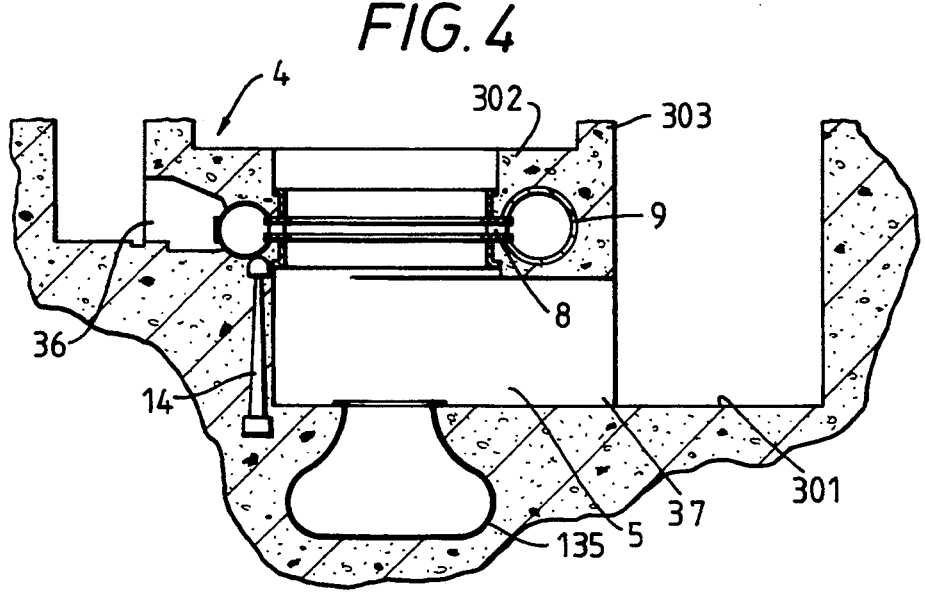
FIG. 4 is a vertical section showing subsequent installation of a spiral casing and speed ring.

FIG. 3 shows the initial situation, in which a simple concrete lining is provided in the cave. The lower draft conduit has its steel liner 135 in the concrete floor 301. FIG. 3 also shows a movable crane 15 above the pit. This is conventional for such installations, and its presence is assumed in the subsequent Figures and description.

Figure 5:
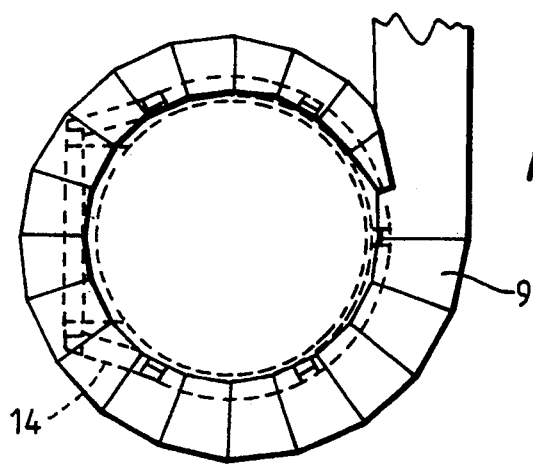
FIG. 5 shows, in plan view, the relation of the spiral casing to a support frame.

A load bearing support frame 14 (FIG. 4) is positioned with its base embedded in the concrete floor, and the preformed spiral casing 9, with the speed ring 8 welded in, is supported thereon as illustrated in FIG. 5. Final welding of the casing 9 may be done after positioning. The frame 14 is adjusted to align the casing 9 horizontally. These elements are then concreted in by a central concrete bulkhead 302 which surrounds the spiral casing 9 and supports it on the bottom floor 301, leaving only a narrow water access passage 36 to the spiral casing 9, a central circular aperture through the speed ring 8, and a large access passage 37 extending beneath the speed ring 8 and spiral casing 9 to form a lower working space 5 beneath the speed ring.

Figure 6:
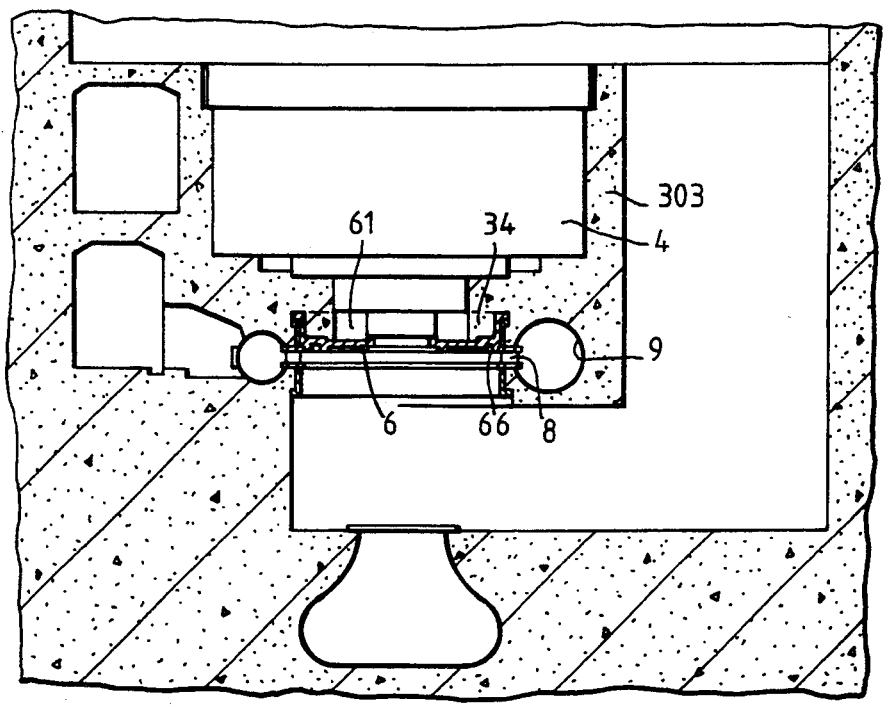
FIG. 6 is a vertical section showing subsequent installation of an upper cover.
Figure 7:
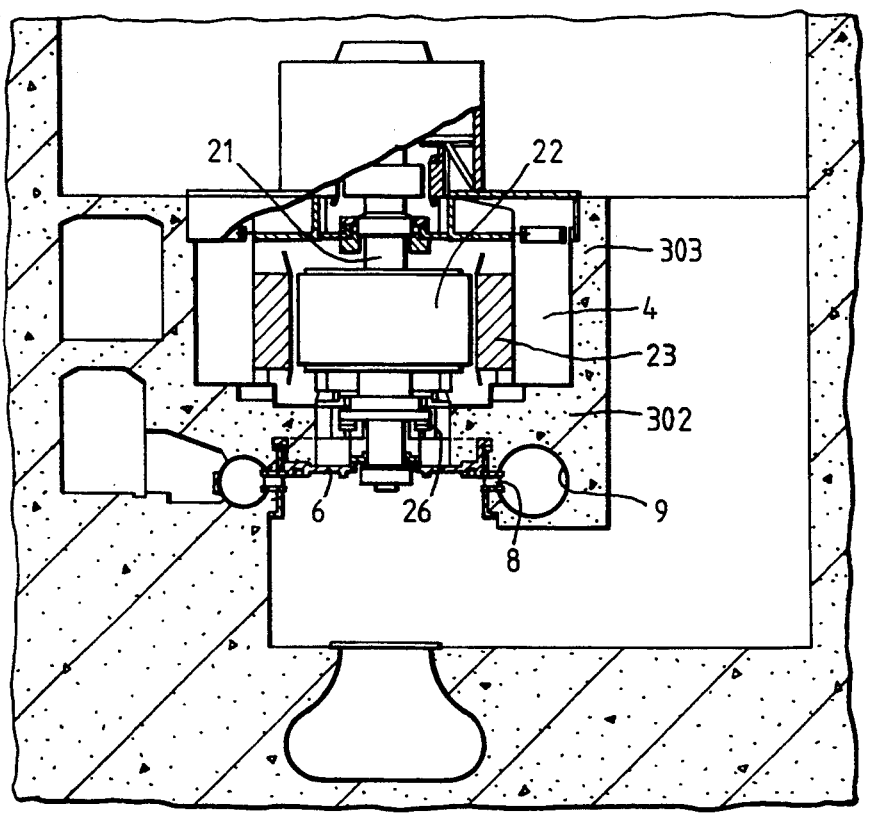
FIG. 7 is a vertical section showing an electric machine installation above the upper cover.

Above the bulkhead 302 is defined an upper working space 4 with a surrounding wall 303 seen better in FIG. 6.

The upper cover 6 of the hydraulic machine is then installed across the circular central opening, with its reinforcing ribs 61 projecting upwardly, and fixed around the speed ring 8. Additional concrete 34 is then formed, integrally with the existing concrete bulkhead and walls, to overlap the periphery of the upper cover 6. The upper cover 6 is then held firmly in place and constitutes a vertically intermediate fixing location in the pit, in relation to which both upper and lower components can be assembled.

The electric machine 2 is subsequently installed above the upper cover 6. Specifically, the stator 23 is supported on the concrete bulkhead 302, which forms an intermediate floor 31 therefor. The rotor 22 and its shaft 21 are craned in, the shaft bottom end being inserted onto the thrust bearing 26 mounted on the top plate 6, and the other parts of the shaft 21 being supported by the upper and lower radial bearings described above.

Excepting the shaft and the use of the thrust bearing 26 onto the upper cover 6, the components of the electric machine and their modes of installation may as such be conventional.

After installation, an annular upper working space 4 surrounds the electric machine within the concrete wall 303.

FIG. 8 shows how the bottom end of the shaft 21 is inserted down through the central aperture of the cover 6 so as to be ready for fitting of the runner 10.

FIGS. 8 to 10 and 13 illustrate the basic steps of installing the hydraulic machine. Firstly, as shown in FIG. 8, a servo-controlled hydraulic lift 16 is supported over the mouth of the lower draft conduit 135. The runner 10 is positioned on the lift platform 161 in alignment beneath the shaft 21, lifted into place and bolted securely to the end of the shaft 21. Because the shaft end and runner 10 are accessible in the working space 5 it is easy to fix the runner 10 directly and securely, by comparison with the conventional assembly in which the runner is already enclosed in the turbine space and the shaft must be secured to it from above.

The next stage is the installation of the lower cover 7, on which the guide vane assembly 11 and its operating unit 12 are pre-assembled. The shaft 112 of each guide vane 111 extends down through a respective bearing hole 71 in the rim of the lower cover 7 to the connecting linkage 114, and upwardly to a free end 112' which is for engagement in a corresponding bearing hole 66 provided at the periphery of the upper cover 6.

Figure 9:
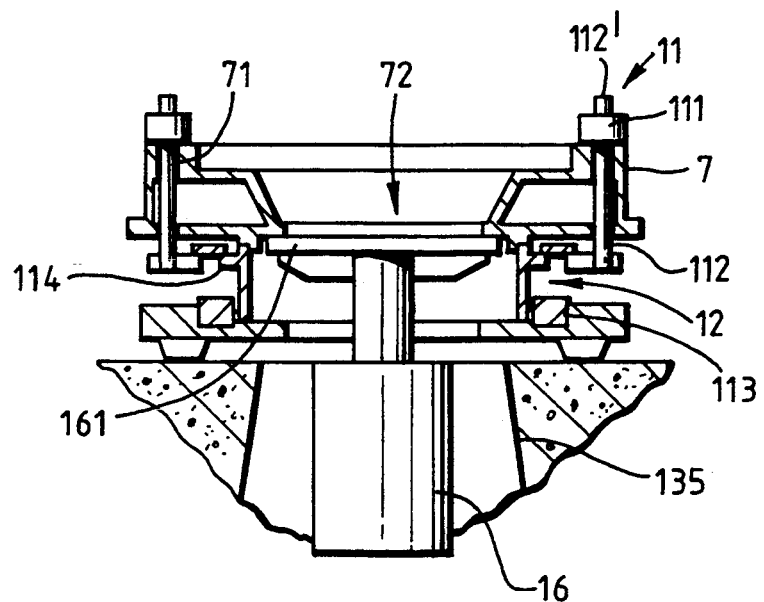
FIG. 9 is a vertical section showing a turbine lower cover before installation.

After installing the runner 10, the lift 16 is lowered and the lower cover assembly 7 positioned on its platform 161 as seen in FIG. 9.

Figure 10:
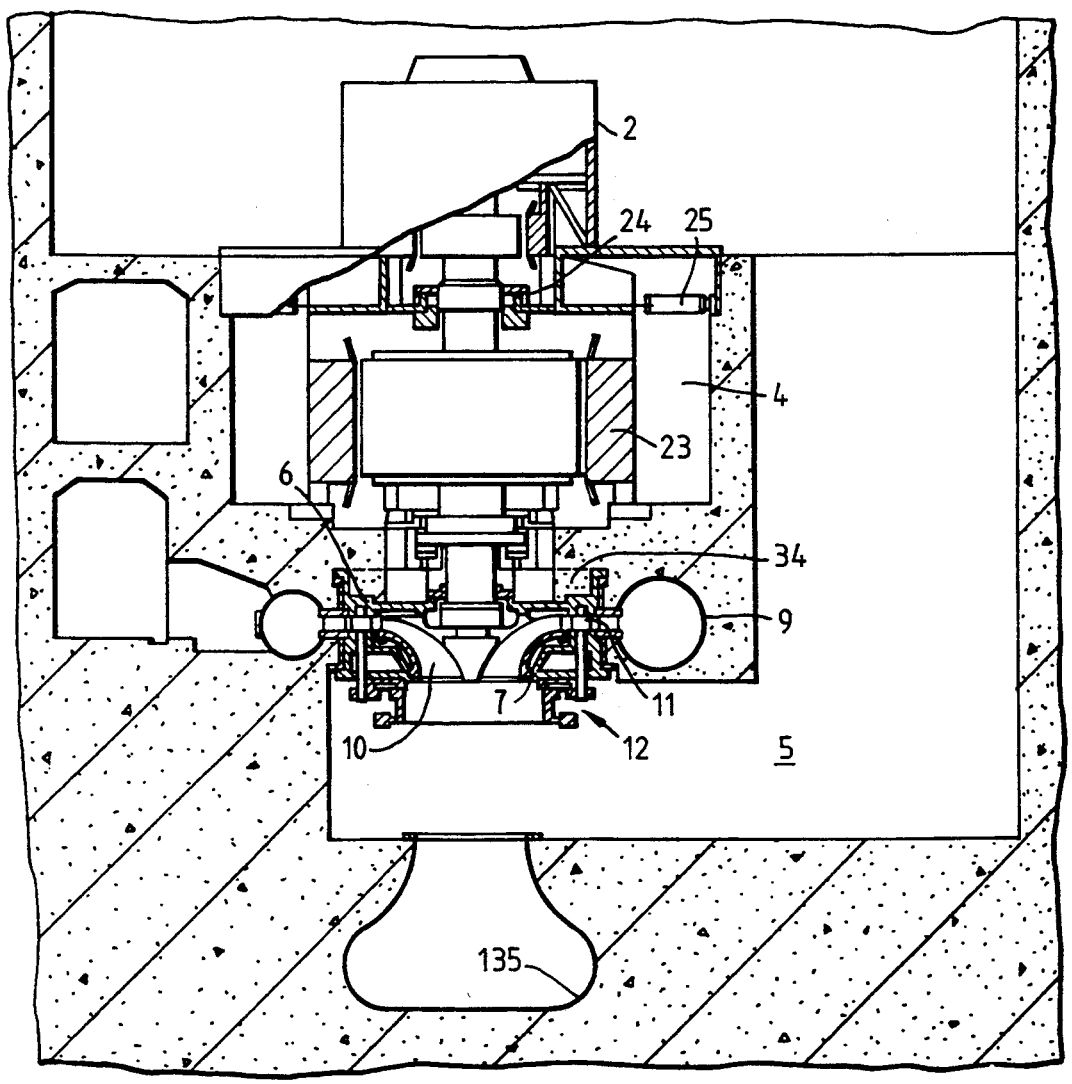
FIG. 10 shows the turbine lower cover installed.

The assembly is then lifted towards the upper cover 6 and runner 10 until the free ends 112' of the guide vane shafts 112 engage in their corresponding bearing holes 66 of the upper cover 6. The upper and lower covers 6,7 are then fixed securely together by appropriate means, to complete the turbine chamber and its guide vane system. FIG. 10 shows the entire installation at this stage.

In this procedure, the components of the hydraulic machine can be moved into place at any time after the upper cover 6 and the lower end engagement for the shaft 21 are in place, since the lower working space can accommodate movement, removal and introduction of even the major hydraulic components.

FIGS. 11 and 11(a) illustrate an advantageous way of guiding the top ends 112' of the guide vane shafts 112 into their engagement holes 66 of the upper cover 6. A circular template 115 having inner and outer template segments 116,117 fixed together by fasteners 118 to define a circumferential array of precisely-spaced alignment holes 119, is fitted over the upstanding free ends 112' of the guide vane shafts 112. The guide vanes and their shafts, which would otherwise be liable to misalignment while supported only at their lower ends, are thereby formed into a free-standing aligned array which engages more reliably with the bearing holes 66 of the upper cover 6. Once engaged, the template 115 is disassembled and the guide vane assembly 11 shifted to its final securing position.

Instead of using a lift, the lower cover assembly may be moved by hoisting wires 120 such as shown in FIG. 11.

FIG. 12 shows another guiding possibility, in which the upper ends 112" of the guide vane shafts 112 are provided with tapered guide slots 121 opening upwardly, and the top cover holes 66 have downwardly projecting guide pins 122 which engage in the slots 121 at some vertical distance and guide them into exact engagement with the upper bearings.

Figure 14:
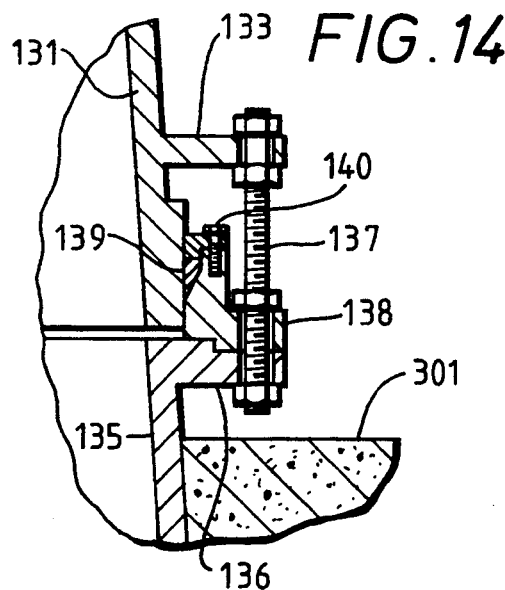
FIG. 14 shows, in vertical cross-section, joining of a draft pipe.
Figure 13:
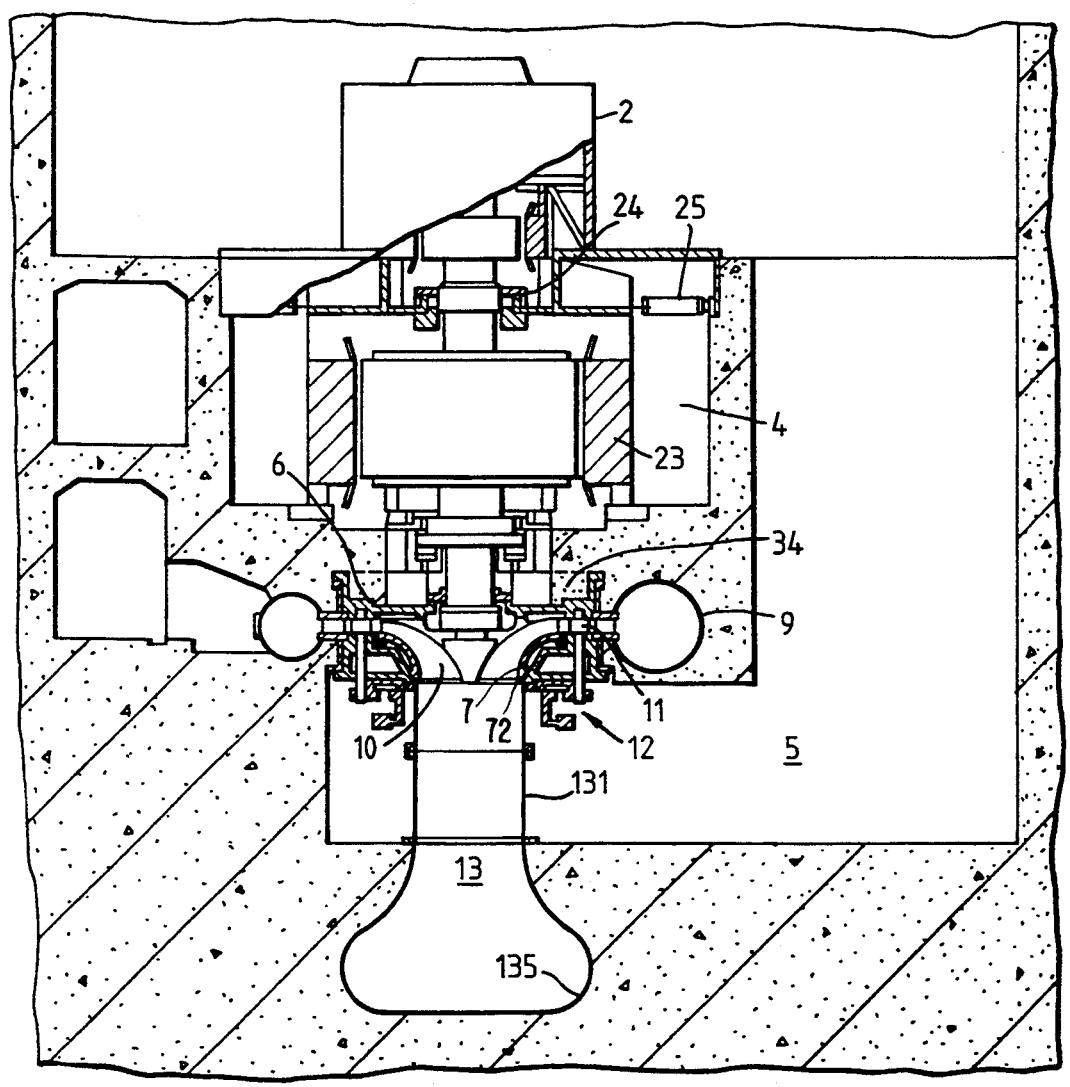
FIG. 13 shows in vertical section the hydroelectric installation substantially completed by the addition of a draft pipe.

FIG. 13 shows how the assembly is completed by installing a steel pipe 131 between the central outlet opening 72 of the lower cover 7 and the upward opening of the lower part 135 of the draft conduit 13, thereby forming the upper part of that draft conduit and completing the water path. FIG. 14 illustrates a suitable joint for the steel liner pipes 131,135, using long bolts 137 connecting between fixed flanges 113,136 of the upper and lower pipes 131,135. A loose flange 138 is fitted on the bolts 137 between the fixed flanges and has a clamping wedge 139 which grips the outer surface of the pipe 131 under the influence of a clamping bolt 140. Other methods may be used, of course, and the lower ends of the bolts 137 may be concreted in if desired.

FIG. 15 illustrates, in chart form, the saving in time which the present procedure can achieve in comparison to a conventional procedure, as a result of the freedom to assemble the electric machine while the hydraulic machine is not yet complete. H and E refer to the hydraulic and electric installations respectively; C and I denote respectively a conventional technique and a procedure embodying the invention.

Figure 16:
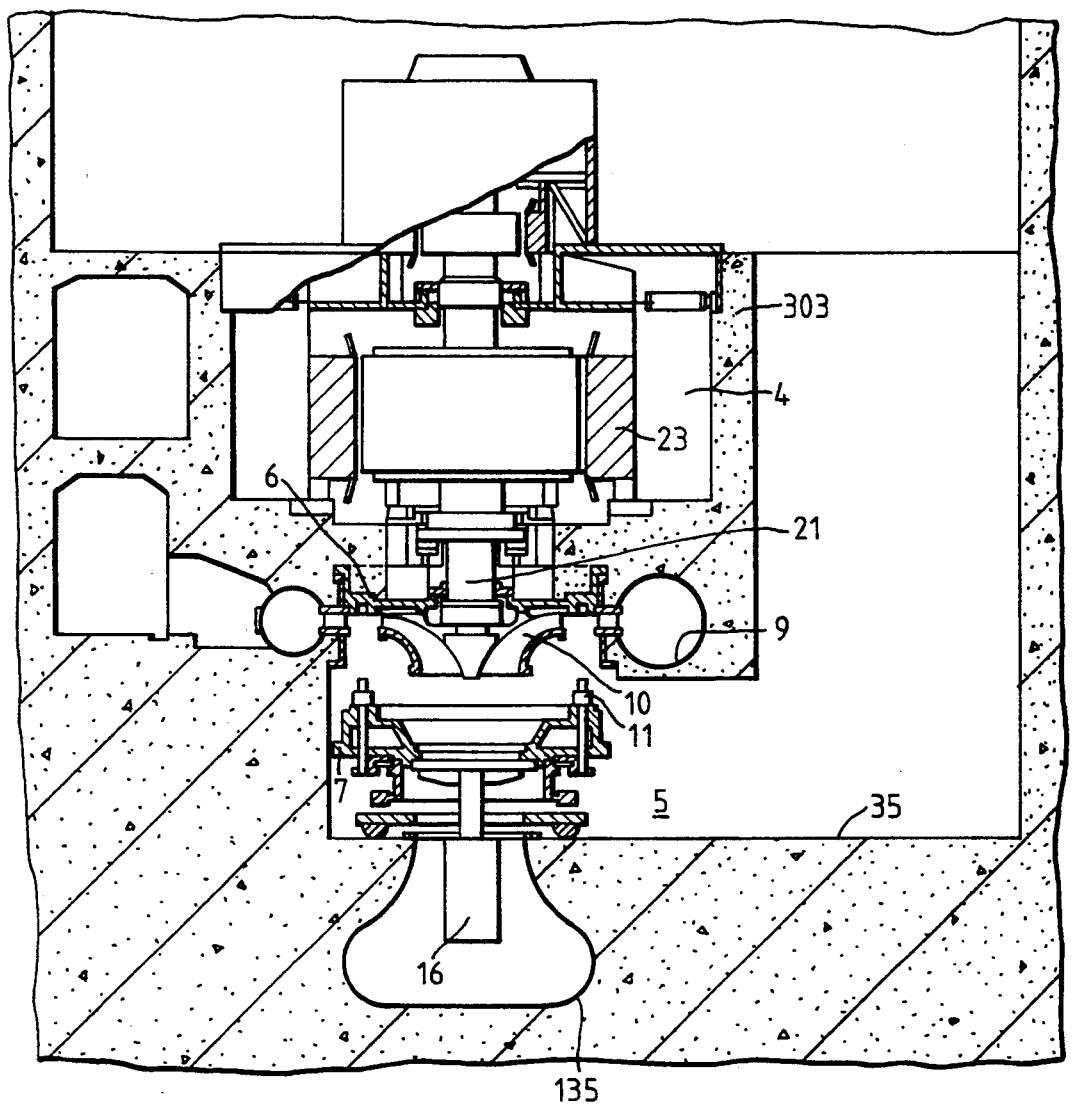
FIG. 16 shows in vertical cross-section how the installation may be disassembled.

FIG. 16 shows how the characteristic construction disclosed herein is advantageous not only at the time of assembly, but also for maintenance. In prior constructions, the major parts of the hydraulic machine could not be accessed without removing the electric machine. In this construction, there exists a lower working space 5 which permits movement, removal and introduction of the major hydraulic components. It therefore becomes possible to disassemble the hydraulic machine in that working space 5, without any need to disturb the electric machine. The Figure shows, by way of example, removal of the lower cover assembly 7.

The installation also shows a significant reduction in vertical height, compared with conventional installations. Since the process involves digging a cave in which the machines must fit, this can save a large amount of work by reducing the necessary height of that cave. The reduction in height is achieved since the operating unit for the guide vanes projects downwardly from the hydraulic machine, so that the necessary thrust bearing for the shaft need not be spaced upwardly to provide clearance for an upwardly-projecting operating unit but on the contrary can be positioned to bear directly against the upper cover of the hydraulic machine. The shaft can therefore be substantially shorter overall. It also obviates the use of an additional radial bearing, which has previously been necessary at the bottom end of the shaft to guide it adjacent the upper cover.

In particular (FIG. 1) the height H of the intermediate floor 31 above the median level of the spiral casing 9 can be less than the radius (W) of the spiral casing circumferential axis from the axis of the central shaft 21.

We claim:

1. A hydroelectric installation comprising an electric machine and a hydraulic machine, the electric machine being installed above the hydraulic machine in an installation pit;

the hydraulic machine comprising a spiral case, an upper cover, a lower cover below the upper cover, a runner rotatable between the upper cover and the lower cover, a guide vane assembly including plural guide vanes for controlling water flow between the upper and lower covers to the runner, and a guide vane operating unit for adjusting the guide vanes;

the electric machine comprising a stator, an upright shaft having a longitudinal axis and connected to rotate with the runner of the hydraulic machine about the shaft axis, and a rotor on the shaft; and a vertical thrust bearing engaging between the shaft and the upper cover;

said installation having a lower assembly space defined in the installation pit around the hydraulic machine, and the guide vane operating unit extending downwardly in said lower assembly space.

2. A hydroelectric installation as claimed in claim in which the vertical thrust bearing comprises a single lower radial bearing engaging the shaft radially below the rotor.

3. A hydroelectric installation as claimed in claim 1 in which the installation pit has an inward wall extension peripherally overlapping the upper cover of the hydraulic machine.

4. A hydroelectric installation as claimed in claim 1 in which the installation pit includes a vertically intermediate floor, the electric machine stator is supported on said vertically intermediate floor, and the vertical height of said intermediate floor above the level of the spiral case of the hydraulic machine is less than any radius of the centre of the spiral case from the shaft axis.

5. A hydroelectric installation as claimed in claim 1, further comprising an upper draft conduit pipe forming an outlet from the lower cover of the hydraulic machine and extending through the lower assembly space.

6. A hydroelectric installation comprising:
    (a) an installation pit having a vertically-intermediate fixing bulkhead dividing the installation pit into a lower assembly space and an upper assembly space;
    (b) a hydraulic machine installed axially vertically in the lower assembly space, said hydraulic machine including:
        a spiral case embedded in the fixing bulkhead;
        a speed ring secured around the inner periphery of the spiral case;
        an upper cover and a lower cover, secured in the speed ring with the upper cover above the lower cover to define a turbine chamber therebetween;
        a bladed runner rotatable in the turbine chamber;
        a guide vane assembly for controlling water flow from the spiral case into the turbine chamber, and
        a servo-driven operating unit connected below the lower cover, for controlling the guide vane assembly;
    (c) an electric machine installed axially vertically in the upper assembly space, said electric machine including:
        a stator,
        a rotor rotatable relative to the stator, and
        an upright shaft, said upright shaft rotating with the rotor and having a lower end secured to the runner of the hydraulic machine; and
    (d) a vertical thrust bearing on the upright shaft, and bearing down on the upper cover of the hydraulic machine.

7. A method of assembling a hydroelectric installation, comprising the steps of:
    (a) forming an installation pit;
    (b) securing a hydraulic machine upper cover in the installation pit at a vertically intermediate position therein;
    (c) assembling further hydraulic machine components, including a rotatable runner, onto said upper cover from below in a lower assembly space of the installation pit, defined below the vertically intermediate position, including installing the rotatable runner beneath said upper cover and subsequently installing a lower cover to form with said upper cover a turbine chamber having said rotatable runner therein, thereby forming a hydraulic machine, and
    (d) assembling electric machine components, including an upright shaft, onto said upper cover from above in an upper installation space of the installation pit, defined above the vertically intermediate position, and connecting said upright shaft to said rotatable runner of the hydraulic machine, thereby forming an electric machine having said upright shaft rotatable with said runner of the hydraulic machine.

8. A method as claimed in claim 7 in which at least a portion of step (c) and at lease a portion of step (d) are done at the same time.

9. A method as claimed in claim 8 in which the upright shaft of the electric machine is assembled onto the upper cover from above before the runner of the hydraulic machine is assembled onto the upper cover from below, and the runner is then fixed to the lower end of the upright shaft.

10. A method as claimed in claim 7 in which in step (b) the upper cover is secured by the steps of:
    securing a hydraulic machine spiral case at the vertically intermediate location;
    securing a speed ring to the hydraulic machine spiral case, and
    fixing the upper cover to the speed ring.

11. A method as claimed in claim 10, comprising forming an inward wall extension of said installation pit to overlap the upper cover peripherally.

12. A method as claimed in claim 7 in which the upright shaft is lowered to rest on the upper cover through a thrust bearing.

13. A method as claimed in claim 7 in which the further hydraulic machine components assembled in step (c) include a guide vane assembly, and a guide vane assembly operating unit for operating said guide vane assembly.

14. A method as claimed in claim 7 in which step (c) comprises lifting the further hydraulic machine components into position by a lift resting at the bottom of the installation pit.

15. A method as claimed in claim 13 in which the guide vane assembly has a plurality of upright guide vane shafts, the upper cover has a corresponding plurality of bearing openings to receive the upper ends of the guide vane shafts, and the further components include guide means for aligning upper ends of the guide vane shafts with respective bearing openings as the guide vane assembly is lifted towards the upper cover.

16. A method as claimed in claim 15 in which the guide means comprises a template fitting over the upper ends of the guide vane shafts to hold the upper ends in alignment with one another.

17. A method as claimed in claim 15 in which the guide means include guide pins projecting downwardly from the bearing openings to engage corresponding guide holes in the upper ends of the guide vane shafts.

18. A method of assembling a hydroelectric installation, comprising the steps of:
 (a) forming an installation pit;
 (b) positioning a spiral case at a vertically intermediate position in the installation pit;
 (c) forming a vertically intermediate fixing bulkhead, embedding the spiral case, to fix the spiral case in position;
 (d) fixing an upper cover in relation to the spiral case, thereby dividing the installation pit into an upper assembly space and a lower assembly space;
 (e) assembling an electric machine in the upper assembly space, including lowering a shaft to rest rotatably on the upper cover through a thrust bearing;
 (f) assembling a hydraulic machine in the lower assembly space, the assembling of the hydraulic machine including:
  lifting a rotatable runner up to the upper cover, and securing said runner to rotate with the shaft of the electric machine;
  lifting a guide vane assembly, comprising a peripherally-distributed plurality of movable guide vanes, into vertical register with the spiral case;
  lifting a lower cover up to the upper cover and securing the lower cover to the upper cover to define a turbine chamber containing the runner between the upper cover and the lower cover, and
  lifting a guide vane operating unit, including a drive and a drive linkage for moving the movable guide vanes, and securing the guide vane operating unit below the vertically intermediate position.

19. A hydroelectric installation comprising an electric machine and a hydraulic machine, the electric machine being installed above the hydraulic machine in an installation pit;
 the hydraulic machine comprising a spiral case, an upper cover, a lower cover below the upper cover, a runner rotatable between the upper cover and the lower cover, a guide vane assembly including plural guide vanes for controlling water flow between the upper and lower covers to the runner, and a guide vane operating unit for adjusting the guide vanes; and
 the electric machine comprising a stator, an upright shaft having a longitudinal axis and connected to rotate with the runner of the hydraulic machine about the shaft axis, and a rotor on the shaft;
 said installation having a vertically intermediate floor with the electric machine stator supported thereon, the vertical height of said intermediate floor above the level of the spiral case of the hydraulic machine being less than any radius of the centre of the spiral case from the shaft axis, said installation further having a lower assembly space defined in the installation pit around the hydraulic machine, the guide vane operating unit extending downwardly in said lower assembly space.

20. A method of assembling a hydroelectric installation, comprising the steps of:
 (a) forming an installation pit;
 (b) securing a hydraulic machine upper cover in the installation pit at a vertically intermediate position therein;
 (c) assembling further hydraulic machine components, including a rotatable runner, onto said upper cover from below in a lower assembly space of the installation pit, defined below the vertically intermediate position, to form a hydraulic machine, by lifting said further hydraulic machine components into position with a lift resting at the bottom of the installation pit, and
 (d) assembling electric machine components, including an upright shaft, onto said upper cover from above in an upper installation space of the installation pit, defined above the vertically intermediate position, and connecting said upright shaft to said rotatable runner of the hydraulic machine, thereby forming an electric machine having said upright shaft rotatable with said runner of the hydraulic machine.

21. A method as claimed in claim 20 in which the guide vane assembly has a plurality of upright guide vane shafts, the upper cover has a corresponding plurality of bearing openings to receive the upper ends of the guide vane shafts, and the further components include guide means for aligning upper ends of the guide vane shafts with respective bearing openings as the guide vane assembly is lifted towards the upper cover.

\* \* \* \* \*